United States Patent Office 3,226,126
Patented Dec. 28, 1965

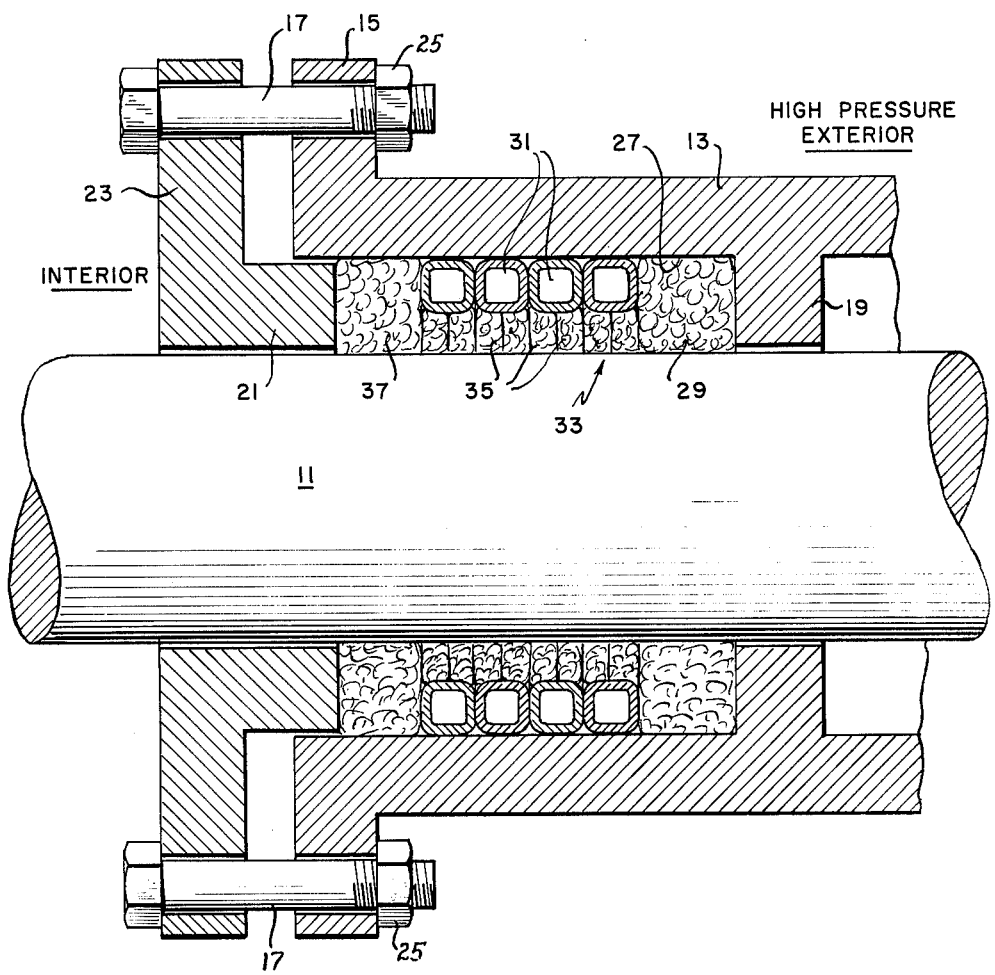

3,226,126
SELF-ADJUSTING PACKING ASSEMBLY
Robert B. Plate, Timonium, Md., assignor to the United States of America as represented by the Secretary of the Navy
Filed Jan. 30, 1963, Ser. No. 255,130
4 Claims. (Cl. 277—125)
(Granted under Title 35, U.S. Code (1952), sec. 266)

The invention described herein may be manufactured and used by or for the Government of the United States of America for governmental purposes without the payment of any royalties thereon or therefor.

The present invention relates generally to seals and, more particularly, relates to a self-adjusting packing assembly for retarding the flow of sea water between the propeller shaft and the stern tube into the interior compartments of deep submergent submarines.

Prior art arrangements such as rotary rod packing and mechanical seals for preventing or retarding the flow of sea water around the propeller shaft into interior compartments of submarines have not met with any particular success. This is due primarily to seal or packing misalignment caused by wear and hull distortion at high sea water pressure. Once misalignment has occurred, excessive leakage of sea water results.

The disadvantages of the prior art are overome according to the present invention by providing a stuffing box packed with deformable but resilient shaft sealing material of low frictional resistance such as flax and by providing shaft load responsive means for redistributing pressure as a function of misalignment through the shaft sealing material. By this arrangement there is provided a self-adjusting seal which prevents excess leakage despite misalignment and which permits controlled leakage for necessary cooling purposes.

Accordingly, an object of the present invention is to provide a stuffing box which adjusts itself with shaft misalignment to maintain a shaft seal and prevent excess leakage.

Another object of this invention is the provision of a stuffing box which is self-adjustable by means of redistribution of pressure acting on sealing material to maintain a seal despite shaft misalignment and which is externally adjustable according to operating conditions and amount of wear.

Yet another object of this invention is to provide a self-adjusting stuffing box of flexible design and simple and economical construction.

Other objects, features and advantages will become better understood by referring to the accompanying drawings in which the single figure is a view in longitudinal cross section of an embodiment of a self-adjusting stuffing or packing box according to the invention.

Referring to the single figure, a shaft 11 to be sealed is supported in any suitable manner for extension through a submarine stern tube 13. The respective interior and high pressure exterior of the submarine are indicated in legend.

The stern tube 13 has a flange 15 bored for receiving wear condition adjusting studs 17. The stern tube 13 also has an inwardly facing shoulder 19 against which packing or stuffing elements are to be squeezed to effect a seal with the shaft 11.

A tubular gland 21 surrounding the shaft 11 has a flange 23. Holes are drilled through the flange 23 for receiving the inner ends of the studs 17. Adjusting nuts 25 are provided at the interior end of the stud 17 for adjusting the gland position back and forth along the shaft 11 The stern tube 13 and the gland 21 together form an elongated annular space or stuffing box 27 around the shaft 11.

Prior to adjusting the gland, packing elements are assembled in the space or stuffing box 27 in the following manner and order:

First, an annular braided flax packing 29 square in cross section and even dimensions with the annular space 27 is inserted into the space 27 to rest in intimate contact against the interior side of the inwardly facing shoulder 19 and against the shaft 11.

A first of several substantially identical plastic or rubber tubes 31 initially circular in cross section, is inserted in the space or stuffing box 27 to rest against the flax packing 29. Each of the tubes 31 is annular in form and is completely filled with a liquid such as deaerated water, ethylene glycol, oil, or the like.

By way of illustration and not of limitation, the particular type of tubing employed may be of vinyl chloride similar to "Tygon-Formulation R–3603" described in Bulletin T–100R of the U.S. Stoneware Co. The tubes 31 may be filled with the liquid and sealed in any suitable manner.

The outside diameter of each of the tubes 31 is approximately equal to the inside diameter of the stern tube 13. However, the inside diameter of each annular tube 31 is sufficiently greater than that of the shaft 11 so that an inner annular space 33 is formed between the shaft 11 and the tube 31.

Into the inner space 33 are fitted in axially tandem relation a first pair of several pairs of packing rings 35. Each of the packing rings 35 consists of a flax bundle essentially square or rectangular in cross section. There is a pair of rings 35 juxtaposed with each tube 31. The rings 35 may be inserted one at a time and form a tight fit between each of the tubes 31 and the shaft 11, with their respective joints staggered 90° relatively from one another.

In the same manner as described for the positioning of the first tube 31 and the first pair of rings 35, successive identical tubes 31 and rings 35 are juxtaposedly inserted in axially tandem relation in the space 27 surrounding the shaft 11 so that there results a configuration of four watertight annular tubes 31 and eight flax rings 35 coextensively positioned in a tightly packed stack along the shaft 11.

Next, an annular braided flax retainer packing 37 identical in form to the packing 29 is placed into the space 27 abutting the interiormost tube 31 and ring 35 and surrounding the shaft 11.

The last step in assembling the packing is the placing of the gland 21 between the stern tube 13 and the shaft 11 so that the exteriormost end of the gland bears against the interiormost end of the interior flax retainer packing 37. The gland nuts 25 are tightened by hand to the extent that the initially round tubes 31 become rectangular or square in cross section and press against the flax rings 35 for substantially complete elimination of air pockets in the stuffing box 27.

In operation, when run out or misalignment of the shaft 11 occurs, even momentarily, resulting compression of the liquid filled tubes 31 on one side of the shaft 11 will cause a corresponding expansion in the tubes 31 on the other side of the shaft. Further, in that the tubes 31 are confined in an essentially constant space, any pressure applied from without to any part of the liquid confined in the tubes 31 is transmitted substantially equally in all directions to every part of the flax material packed in the interior of the stuffing box 27. This pressure is redistributed to the flax packing elements which then "follow" or adjust themselves in an essentially continuous "reseating" manner corresponding to movements between the shaft 11 and the wall portion 13. This action provides a definite advantage because wear is spread out rather evenly along all of the shaft engaging rings 35. This coaction is in contrast to that of prior art arrangements in which the wear is uneven, usually the greatest on the packing rings nearest the gland. Mechanical seals using relatively hard contacting surfaces are even less effective because of binding tendencies causing heat and even greater uneveness of wear.

In one working model built according to the present invention, wherein the terminal flax elements 29 and 37 were about 5/8" square in cross section; the rings 35 were about 1/4" square in cross section, and the stuffing box pressure was about 550 lbs. (affording controlled cooling leakage of about up to one gallon per hour), the jacking of the shaft about 1/16" out of alignment at one end of the box was essentially immediately followed by the self-adjusting realignment of the assembly without undue leakage. Moreover, when the shaft was returned to alignment, the assembly quickly adjusted itself without increase in leakage.

The present invention thus affords a packing box which is self-adjusting by virtue of the action of confined liquid distributing pressure to all surfaces in the packing assembly with controlled high pressure leakage and a minimum of gland adjustment.

Obviously many modifications and variations of the present invention are possible in the light of the above teachings. It is therefore to be understood that within the scope of the appended claims the invention may be practiced otherwise than as specifically described.

What is claimed is:

1. A self-adjusting packing assembly for sealing a submarine propeller shaft adapted to be mounted in a stern tube having an annular inwardly extending shoulder thereon defining a stuffing box within said stern tube surrounding a portion of said propeller shaft, said packing assembly comprising:

a first annular packing member carried within said stuffing box and abutting said annular shoulder on said stern tube;

the inner periphery of said first annular packing member being in intimate contact with the outer periphery of said propeller shaft and the outer periphery of said annular packing member engaging the inner periphery of said stuffing box;

a plurality of hollow annular members arranged coaxially in side-by-side relationship within said stuffing box with the innermost of said hollow annular members abutting said first annular packing member;

said hollow annular members each being made of a resilient material and each being completely filled with a substantially incompressible liquid;

said hollow annular members each being separately and individually sealed and thereby being fluid-tight;

said hollow annular members having outside and inside diameters of a size such that the outer peripheries thereof engage the inner periphery of said stuffing box and the inner peripheries thereof define a space between the inner peripheries and the periphery of said shaft;

a pair of packing rings carried in the space between the inner periphery of each of said hollow annular members and the periphery of said shaft;

said packing rings arranged coaxially within said space in side-by-side relationship and tightly fitting the periphery of said shaft and the inner periphery of each of said hollow annular members;

a second annular packing member carried within said stuffing box and abutting the outermost of said coaxially arranged hollow annular members;

the inner periphery of said second packing member being in intimate contact with the periphery of said propeller shaft and the outer periphery thereof engaging the inner periphery of said stuffing box; and an adjustable gland member bearing on said second annular packing member for applying a compressive force on said annular packing members, said packing rings and said hollow annular members within said stuffing box to thereby effect a seal between the inner peripheries of said packing rings and the periphery of said shaft;

said liquid in said hollow annular members undergoing compression and redistribution within said hollow annular members upon misalignment of said shaft within said stern tube and thereby being operable to exert a pressure on said packing members and packing rings in areas other than the area of misalignment of said shaft to adjust the configurations of said packing members and packing rings relative to said shaft to maintain a constant sealing engagement between the inner peripheries of said packing members and packing rings and the periphery of said misaligned shaft.

2. A self-adjusting packing assembly as claimed in claim 1 wherein said packing members and packing rings are made of flax.

3. A self-adjusting packing assembly as claimed in claim 1 wherein said fluid-filled annular members are made of vinyl chloride and said liquid therein is de-aerated water.

4. A self-adjusting packing assembly as claimed in claim 1 wherein said hollow annular members are made of rubber and said liquid therein is ethylene glycol.

References Cited by the Examiner

UNITED STATES PATENTS

| 2,893,060 | 7/1954 | Wills | 277—34 X |
| 2,943,874 | 7/1960 | Valdi et al. | 277—34 |

FOREIGN PATENTS

| 192,867 | 2/1923 | Great Britain. |
| 650,641 | 2/1951 | Great Britain. |

LAVERNE D. GEIGER, *Primary Examiner.*

SAMUEL B. ROTHBERG, *Examiner.*